Patented Apr. 6, 1926.

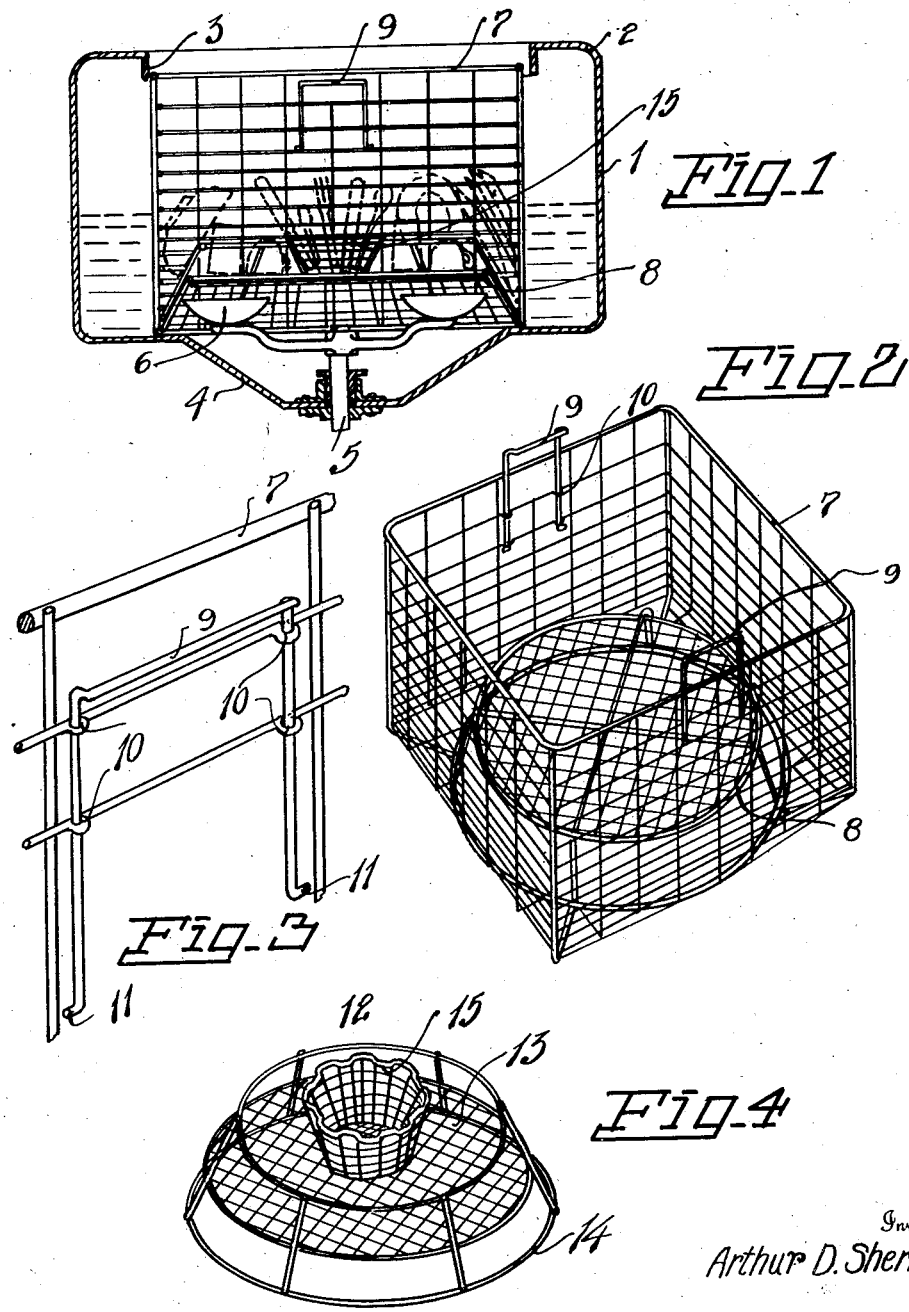

1,579,569

UNITED STATES PATENT OFFICE.

ARTHUR D. SHERRICK, OF SPOKANE, WASHINGTON.

DISHWASHER.

Application filed April 2, 1925. Serial No. 20,170.

*To all whom it may concern:*

Be it known that I, ARTHUR D. SHERRICK, a citizen of the United States, residing at Spokane, in Spokane County and State of Washington, have invented certain new and useful Improvements in Dishwashers, of which the following is a specification.

My present invention relates to improvements in dishwashers especially adapted for domestic use as well as for public service places, and designed to provide an improved basket or rack for the reception of dishes and utensils to be cleansed and drained, while retained in the container or basket.

The device of my invention is applicable for use with that type of dishwasher or washing machine in which an impeller or pump is employed for spraying the cleansing water upwardly from a reservoir through the basket or perforated container for the dishes, and in which the water returns to the reservoir by gravity.

The pump or impeller is of the rotary type and arranged centrally of the bowl of the washing machine and the basket of my invention is constructed in such manner as to well adapt it to the bowl and impeller in order that the cleansing action may be rapid and thorough. The invention also contemplates the use of an auxiliary, removable stacker or bottom extension for the basket adapting it for the accommodation of various dishes, plates and utensils.

The invention consists in certain novel combinations and arrangements of parts as will be more specifically set forth and claimed.

In the accompanying drawings I have illustrated one complete example of the physical embodiment of my invention wherein the parts are combined and arranged according to the best mode I have thus far devised for the practical application of the principles of my invention.

Figure 1 is a vertical central sectional view of a washer bowl showing the basket of my invention therein with contained dishes and utensils illustrated in dotted lines.

Figure 2 is a perspective view of the basket.

Figure 3 is an enlarged detail perspective view showing the handle construction of the basket.

Figure 4 is a perspective view of the auxiliary stacker or removable extension for the basket.

In order that the general relation of parts and the utility of the invention may readily be understood I have shown in Figure 1 a well known or standard type of wash bowl 1 having upper horizontal guard ring 2 and a depending flange 3 at the top of the open bowl. The bottom of the bowl is fashioned with a conical shaped reservoir 4 for the cleansing water and a vertically disposed rotary shaft 5 is journaled to revolve in the bottom and by means of the impeller blades 6 thereon throw or spray the cleansing water upwardly, with a fountain action, through the bowl. The water is maintained in continuous circulation passing upwardly through the central part of the bowl, which latter is covered if necessary during the washing operation, and the water returns to the reservoir to be again lifted by the impellers.

In the preferred form of my invention the basket 7 is constructed in rectangular shape of suitable wires and fashioned in suitable machines with an elevated, frusto-conical bottom portion 8. As seen in Figure 1 the basket rests upon the bottom of the bowl with the conical bottom directly above the reservoir and rotary impellers of the dish washing machine, and as all parts of the basket are reticulated it will be apparent that dishes, plates and other tableware placed therein will be thoroughly cleansed by the circulation of the water.

After cleansing of the contents of the basket it is removed from the bowl for draining and drying the contents. For this purpose I utilize a pair of handles 9 preferably of inverted U-shape and slidable in the pairs of supporting loops or eyes 10 fashioned in the reticulated walls of the basket. When the filled basket is placed in the bowl the handles are slid down in their supporting loops to position of Figures 1, and 3 out of the way of the top or lid of the bowl. When the handles are to be used they are lifted to position of Figure 2, where the bent ends or lugs 11 at the lower ends of the handles engage against the lower sides of the lower pair of loops 10 to be effective in supporting the basket.

A removable auxiliary basket or stacker, which forms an extension of the elevated bottom of the basket is designated as a whole by the numeral 12 as best seen in Figure 4. The stacker is provided with a circular, flat reticulated bottom 13 of approximately the diameter of the top of the elevated bottom of the basket and is adapted to rest thereon when in use. A conical shaped, or frusto-conical shaped frame 14 is provided for the reticulated bottom 13 and projects both above and below the bottom 13 as shown in Figure 4. The lower portion of this frusto-conical frame is designed to fit over the lateral conical portion of the elevated bottom 8 and the upper part of this frame projects or extends above the top portion of the elevated bottom of the basket to form a rack for the support of dishes, plates &c. that may be placed on edge and in tilted position between the extension and the side walls of the basket.

For the reception of smaller utensils, as table silverware in the form of knives, forks and spoons, a central small basket 15 is formed on the bottom 13 of the auxiliary stacker and used as shown in Figure 1 where the silverware is shown in dotted lines, with glassware between the central basket and the frame.

When not required for use the auxiliary stacker may be removed and the elevated bottom of the basket is used for standing the dishes or plates on edge around the elevated bottom and between it and the side walls of the basket. The dishes plates &c. are arranged with their faces toward the fountain or spray of water for most effective washing or cleaning. After the china, glassware and silverware have been cleansed and the central stacker or removable extension has been removed, the pots and pans and other similar utensils are cleansed.

Having thus fully described my invention what I claim as new and desire to secure by Letters Patent is—

1. The combination with a basket having an elevated bottom and side walls to said bottom, of a removable stacker having a reticulated body portion to rest on top of said bottom, and a frame on the stacker having a lower portion to frictionally engage said side walls and an upper portion projecting above the basket bottom and said stacker body portion.

2. The combination with a rectangular basket having an elevated frusto-conical bottom portion of a removable stacker having a flat reticulated body, a surrounding frusto-conical frame above and below the body of the stacker and adapted to seat on said elevated bottom.

In testimony whereof I affix my signature.

ARTHUR D. SHERRICK